Sept. 19, 1961   A. L. WALBORN   3,000,641
SPREADER FOR ATTACHMENT TO VEHICLE BODIES
Filed Feb. 24, 1960   3 Sheets-Sheet 1
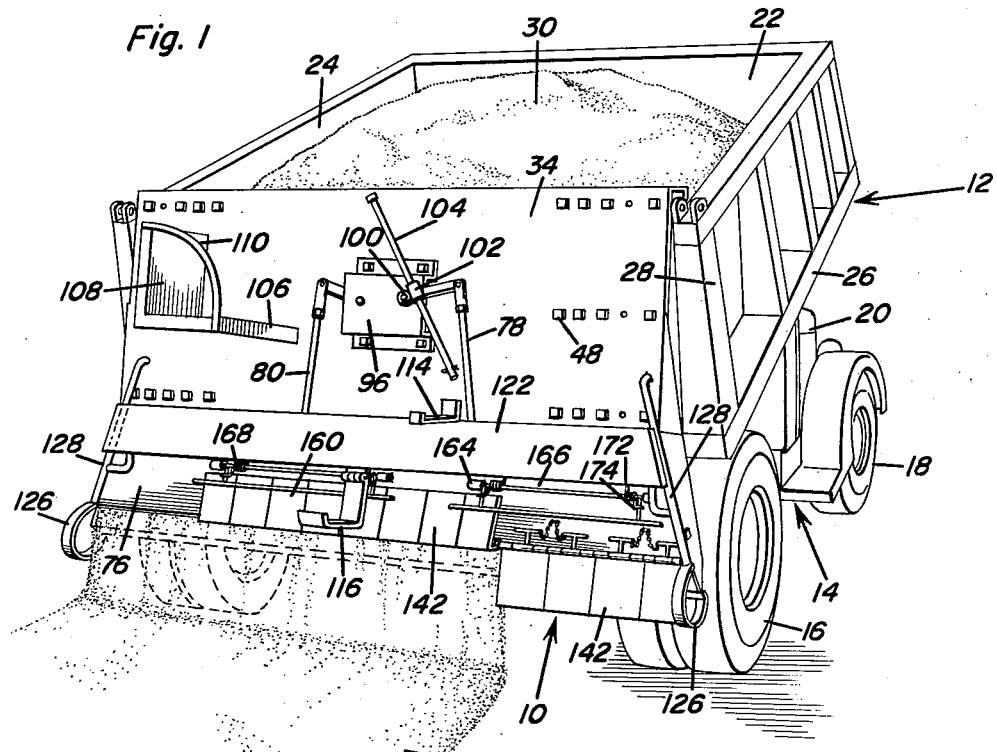
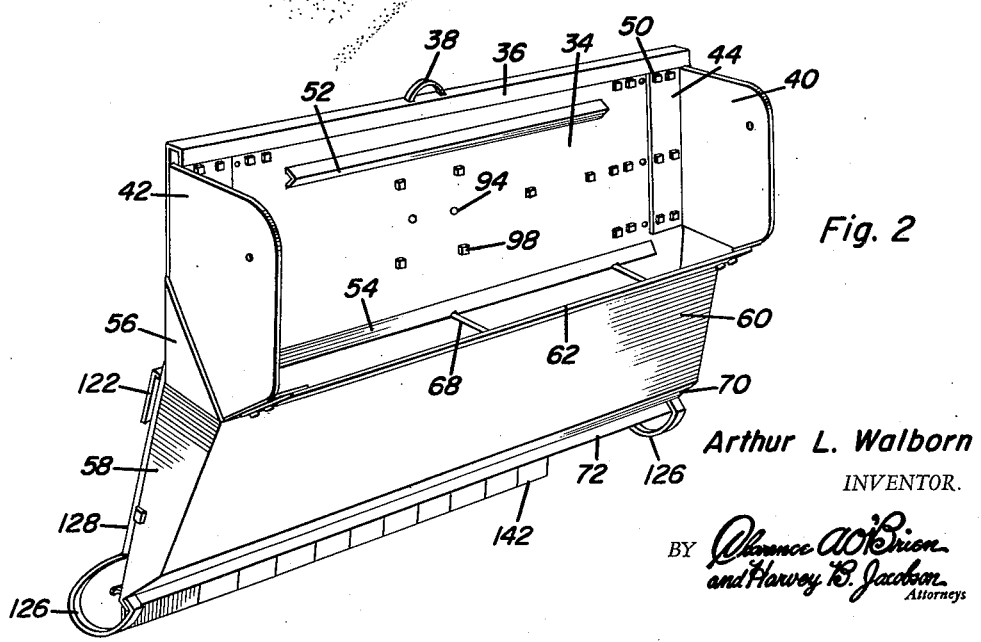
Arthur L. Walborn
INVENTOR.

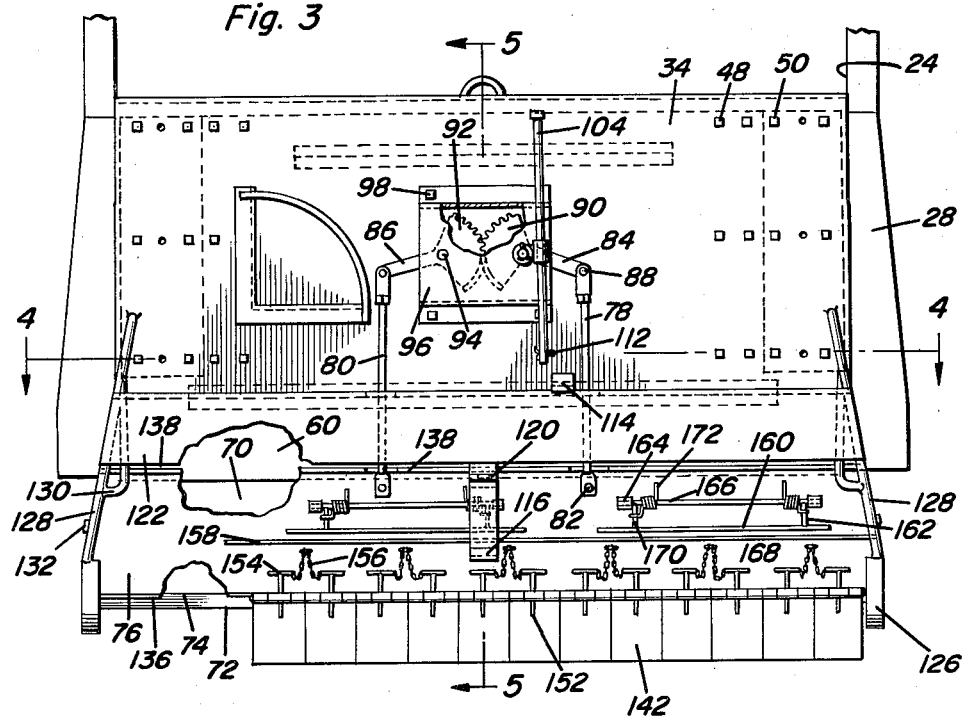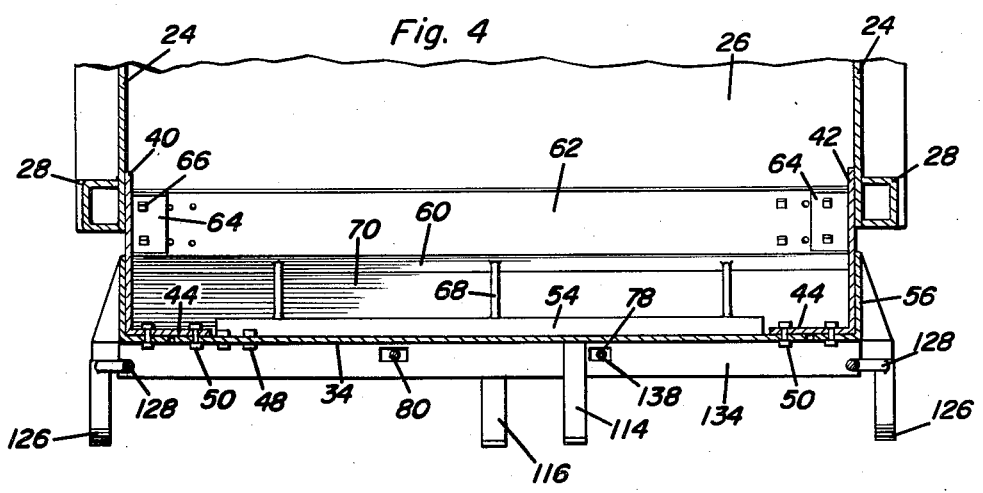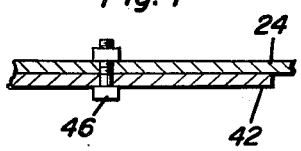

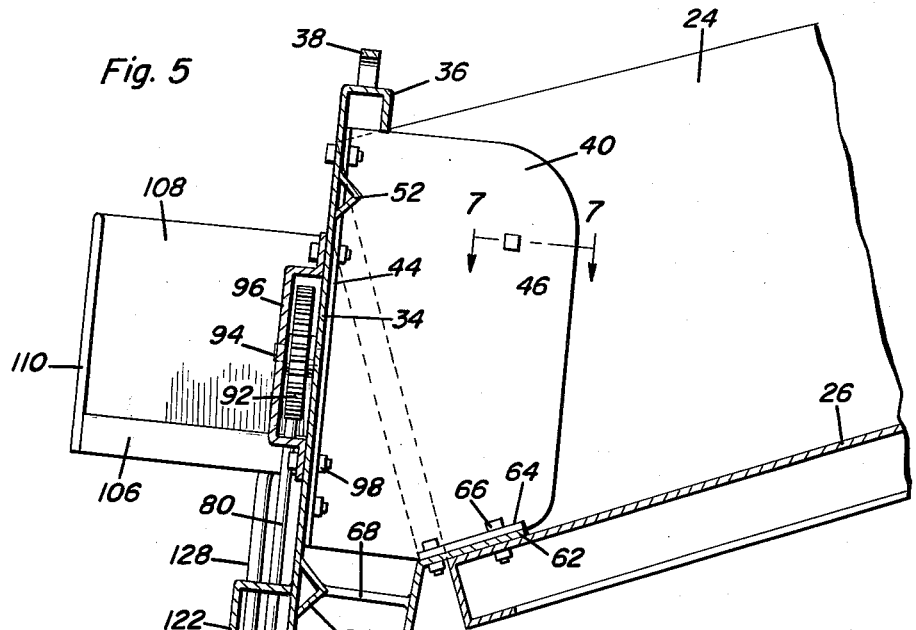
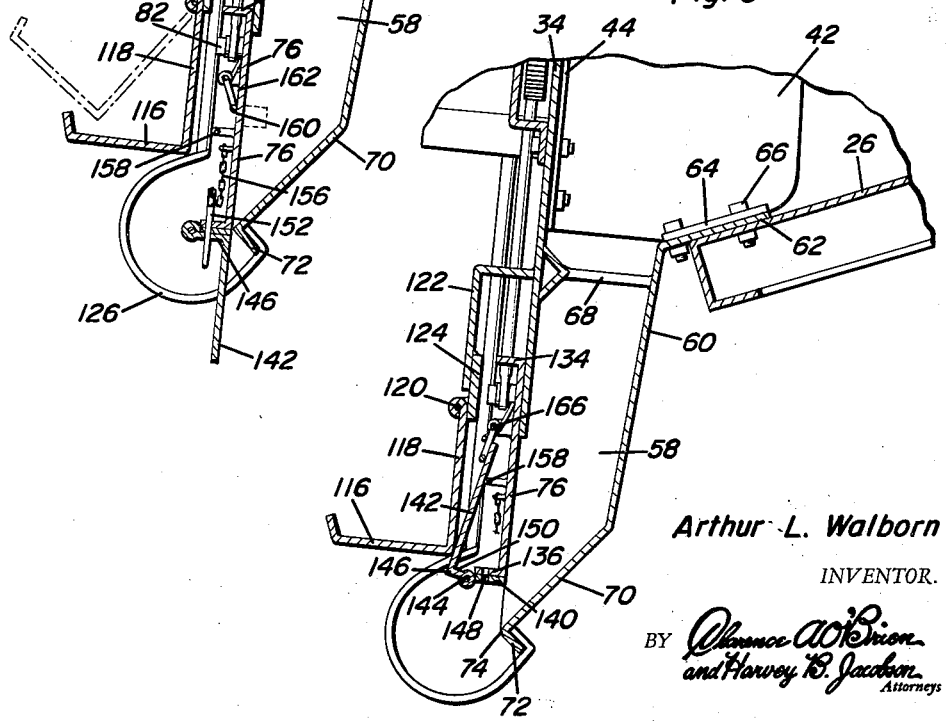

United States Patent Office 3,000,641
Patented Sept. 19, 1961

3,000,641
SPREADER FOR ATTACHMENT TO
VEHICLE BODIES
Arthur L. Walborn, 1312 Hampden Blvd., Reading, Pa.
Filed Feb. 24, 1960, Ser. No. 10,713
7 Claims. (Cl. 275—2)

The present invention generally relates to a mechanical spreader primarily adapted for use in spreading various types of road materials on streets, highways, airports, parking areas or wherever desired, and is bolted to a dump truck body in place of the conventional end gate.

Spreader attachments have previously been provided as exemplified in prior U.S. Patent No. 1,982,773 which is attached to a dump truck body and which includes a mechanism for controlling the rate of flow of material onto the surface being covered. However, the type of device shown in this patent is necessarily for a single width dump truck body and spreads throughout the width of the dump truck body when in use. Therefore, it is the primary object of the present invention to provide an attachment in the form of a spreader capable of mounting on dump truck bodies of different widths so that the attachment may be used with various dump truck bodies having different widths and also to provide a cut-off plate assembly so that the width of spreading may be adjusted as required for a particular purpose with the thickness of the film of material being spread also being adjustable, thereby providing for variation in the width of the film of material being spread as well as the thickness thereof.

The initial primary object of the present invention is accomplished by the provision of adjustable end plates on the spreader attachment having a series of apertures for attachment to the main plate for varying the distance between the end plates which are attached to the main plate thereby varying the effective over-all width of the spreader attachment for engagement with different dump truck bodies having different width dimensions.

The second primary object of the present invention is accomplished by providing a main sliding gate for controlling the depth or thickness of the film together with a plurality of cut-off plates hingedly connected to the sliding gate so that they may be swung into a cut-off position together with a locking mechanism to render the plates in stationary adjusted position so that the spreading width can be adjusted. The plates are six inches in width so that the spreading width can be adjusted to six inch increments.

A further object of the present invention is to provide a spreader attachment for a dump body of a vehicle that is manually adjustable as to the rate of discharge or depth of the film spread by an operator riding on the spreader and manually controlling the discharge rate.

Still another object of the present invention is to provide a spreader of the character described that is relatively simple in construction, easy to install, efficient in operation, long lasting and dependable, easy to adjust and generally inexpensive to manufacture and maintain.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a perspective view of the spreader of the present invention illustrating the manner in which it is associated with a dump truck body;

FIGURE 2 is a front perspective view of the spreader removed from the dump truck body;

FIGURE 3 is a rear elevational view of the spreader with portions broken away illustrating certain details of construction of the spreader;

FIGURE 4 is a top plan sectional view taken substantially upon a plane passing along section line 4—4 of FIGURE 3 illustrating the manner of attaching the spreader to the dump truck body;

FIGURE 5 is a vertical, sectional view taken substantially upon a plane passing along section line 5—5 of FIGURE 3 illustrating further structural details of the spreader attachment;

FIGURE 6 is a detailed sectional view of the lower portion of the structure of FIGURE 5 illustrating the orientation of components with the cut-off plates in retracted or open position;

FIGURE 7 is a detailed sectional view taken substantially upon a plane passing along section line 7—7 of FIGURE 5 illustrating the manner of attaching the tail gate spreader to the vehicle body.

Referring now specifically to the drawings, the numeral 10 generally designates the spreader attachment of the present invention for mounting on a dump body generally designated by the number 12 pivotally supported on a truck vehicle in a conventional nature in which the truck vehicle is generally designated by numeral 14 and includes the usual rear driving wheels 16, front steerable wheels 18, cab 20 and a suitable framework and mechanism for raising and lowering the dump body 12, the details of which are not shown.

The dump body 12 is provided with a front wall 22 and side walls 24 interconnected by a bottom 26 with the side walls being reinforced by vertical external braces including rear brace members 28. Normally, the dump truck body 12 would have a pivotal tailgate at the open rear end thereof for permitting a load of material to be dumped. However, the spreader attachment 10 of the present invention is substituted for the usual tail gate and will control the rate of discharge of the material 30 forming the load within the body 12 so that such material 30 may be discharged onto a surface in the form of a film or a coating 32 having a variable thickness or depth and having also a variable width. The material discharge is variable but will include various road materials such as gravel, crushed stone, sand and other road building material. The device may also be used for spreading other pulverant materials capable of flow when the front of the dump body 12 is elevated.

The spreader attachment 10 includes a main flat generally rectangular plate forming a closure for the rear open end of the dump body 12. The plate is designated by numeral 34 and has a reversely formed channel-shaped flange 36 at the upper edge for rigidifying and strengthening the plate to prevent flexure thereof. The flange 36 is provided with a centrally disposed loop-shaped handle 38 for enabling a suitable lifting device such as a crane or hoist to be employed in assembling or disassembling the spreader attachment in relation to the dump body 12.

Attached to the ends of the blade 34 are end plates 40 and 42 each of which is provided with an inwardly extending flange 44 resting against the inner surface of the plate 34. The end plates 40 and 42 extend interiorly of the side wall 24 and are attached thereto by a removable bolt 46 thereby detachably securing the spreader to the vehicle body. Also, the main plate 34 is provided with a series of longitudinally spaced openings 48 for adjustably securing the flanges 44 in position by virtue of bolts 50 thereby laterally adjusting the position of the end plates 40 and 42 for engagement with different width dump bodies by adjusting the distance between the end plates 40 and 42.

The plate 34 is mounted in rearwardly inclined relation so that it diverges in relation to the rear edges of the side walls 24 of the dump body 26. The end plates or flanges 40 and 42 are substantially received between the side walls 24. For further rigidification of the plate 34, there is provided a longitudinally extending triangular reinforcement 52 adjacent the upper edge thereof and a similar triangular reinforcement 54 adjacent the bottom edge thereof with the triangular reinforcement 54 being disposed just slightly below the bottom 26 of the vehicle body. The end edges of the plate 34 are each provided with a forwardly extending triangular gusset 56 disposed exteriorly of the respective end plates 40 and 42 and extending vertically on the plate 34 for approximately one-half of the vertical height of the dump body. The inclined edge of the triangular plate 56 faces the rear edges of the wall 24 and the bottom edge of the gusset plate 56 is connected with end walls 58 that are also integral with the end edges of the lower portion of the plate 34. Thus, the gusset plates 56 and end walls 58 are a continuation of each other with the walls 58 diverging somewhat in relation to each other as illustrated in FIGURE 3 and also in FIGURE 1 so that the overall effective width of the spreader will include the entire tread width of the vehicle to which the spreader is attached. Of course, the end edges of the lower portion of the plate 34 will also slightly diverge and are connected to the end walls 58.

Interconnecting the front edges of the end walls 58 is a front plate 60 and such connection may be effected by welding or by any other suitable means. The front plate 60, end walls 58 and the lower portion of the main plate 34 cooperate to form what may be termed a hopper for the material. The upper edge of the front wall 60 is provided with a forwardly extending flange 62 underlying an inturned flange 64 on each of the end plates 40 and 42 and adjustably secured thereto by bolts 66 in the same manner that the end plates 40 and 42 are secured to the plate 34 thereby adjustably securing the end plates 40 and 42 in position. The length of the flange 62 may be reduced with the inturned flanges 64 being capable of attachment thereto in an adjustable manner so that when the end plates 40 and 42 are in their innermost adjusted positions, the end plates 40 and 42 will be flush with the outer ends of the flange 62 thereby enabling the flange 62 and flanges 64 to be secured to the bottom 26 of the truck body 12.

Extending between the reinforcement member 54 and the inner surface of the front wall 60 is a plurality of rigidifying rods 68 that are spaced from each other which maintain the front wall 60 spaced from the wall 34 and also acts somewhat to prevent entry of any enlarged articles or elongated material from falling into the hopper formed by the plate 34, front wall 60 and end walls 58. With the foregoing construction, it will be seen that the material 30 within the dump body will be dumped into the hopper when the front of the dump body is elevated.

The lower end of the front wall 60 is inclined rearwardly at a sharper angle than the main portion of the front wall 60 and the lower portion is designated by numeral 70. The terminal end of the lower portion 70 is formed at right angles as designated by numeral 72 thus providing a discharge edge or surface 74 for the hopper which may be closed by virtue of a sliding plate 76 which slides against the outer surface of the lower portion of the main plate 34 and extends throughout the length of the inclined lower portion 70 and the discharge edge 74. When the plate 76 is lowered for engagement with the edge 74, the hopper will be closed and material cannot be discharged therefrom. However, the plate 76 is elevatable and by elevating the plate 76 to the position with the lower end thereof spaced from the edge 74, then material may be discharged from the hopper with the degree of opening of the plate 76 determining the thickness of the film 32 being discharged.

A mechanism is provided for elevating the sliding plate or gate 76 which includes a pair of links 78 and 80 having their lower ends connected to the plate 76 by pivot bolts 82. The upper end of the link 78 is connected to an arm 84 and the upper end of the link 80 is connected to an arm 86 by virtue of pivot pins 88. The arm 84 is rigid with a segmental spur gear 90 and the arm 86 is rigid with a segmental spur gear 94 that are meshed with each other and mounted on pivot pins or shafts 94 extending between plate 34 and a mounting plate 96 bolted to the plate 34 by bolts 98. One of the shafts 94 extends through the plate 96 sufficiently to receive an arm 100 having a sleeve 102 thereon carrying an elongated handle 104. The handle 104 is accessible by an operator sitting on a seat 106 rigidly secured to the plate 34 by any suitable means as by welding. The seat 106 is also provided with a back 108 and a curved retaining arm 110 so that a person may sit on the seat 106 generally crosswise of the truck body and will have access to the handle 104 whereby the position of the sliding gate is adjustable. As illustrated, the handle 104 is slidable in the sleeve 102 within the limits defined by cotter pins 112 thereby enabling the lever arm advantage to be varied depending upon the requirements of the particular operator. This will also enable the handle 104 to be normally disposed within the confines of the plate 34 but enabling the handle to be elevated for increasing the lever arm when desired. Thus, by pivoting the gears 90 and 92, the sliding gate or plate 76 may be elevated or lowered as required for varying the discharge rate from the hopper.

For the operator sitting on the seat 106 there is provided a stationary rigid footrest 114 on the plate 34 adjacent the rear thereof and there is also provided a generally L-shaped footrest 116 at a position in generally overlying relation to the sliding plate 76. The footrest 116 includes a vertically extending mounting portion 118 attached by a hinge 120 to an L-shaped bracket 122 rigidly secured to the plate 34. The hinge 120 is attached to a mounting plate 124 in such a manner that the footrest 116 cannot move inwardly against the sliding plate 76 but can move outwardly into the dotted line position as illustrated in FIGURE 5 for a purpose described hereinafter.

Attached to the lower flange 72 at each end edge is an arcuate strap member 126 which acts as a guard or protector and which extends in a vertical plane and has one terminal end thereof connected to the flange 72 and the other terminal end connected to a support rod 128 which is secured to the plate 34. The rods 128 are interconnected by bracket 122 which is elongated and which is L-shaped except in the areas of passage of the rods 78 and 80.

The rod 128 is provided with an inwardly extending rod-like member 130 which serves as a guide for the sliding plate 76. Also, lugs 132 interconnect the rod 128 and the end walls 58 for rigidifying the rod 128.

The sliding gate or plate 76 is provided with a flange 134 at the upper end thereof and a flange 136 at the lower end thereof which are parallel and extend rearwardly. The links 78 and 80 extend through notches 138 in the flange 134 and engage the studs. Attached to the flange 136 is a plurality of hinge plates 140 each hingedly supporting a cut-off plate 142 by virtue of a hinge pin 144. Each of the cut-off plates 142 is provided with a lateral extension 146 at the upper end thereof which will underlie and butt against the hinge plate 140 when the cut-off plate 142 is in alignment with the sliding plate 76. The flange 136 and the hinge plate 140 are provided with aligned apertures 148 and the extension 146 is also provided with an aperture 150 for alignment with the apertures 148 when the cut-off plate 142 is in alignment with the sliding plate 76. In this position, a tapered locking pin 152 is disposed through the aligned apertures 148 and 150 thereby locking the cut-off plate 142 in alignment with the sliding plate 76 whereby the cut-off plates 142 become extensions of the sliding plate 76. As illustrated in FIGURE 3, each of the tapered pins 152 are T-shaped in configuration and are secured in position by virtue of their T-handle 154 at the upper end thereof. The T-handles are connected by chains 156 to the sliding plate 76 thereby preventing accidental loss of the locking pins 152.

Disposed above the flange 136 and in the path of movement of the pivotal cut-off plates 142 is a stop member or rod 158 fixed to the sliding plate 76 for engaging the cut-off plates 142 when they are swung to an upwardly extending or retracted position as illustrated in the position of FIGURE 6. When this occurs, the cut-off plates 142 are upwardly and inwardly inclined. For retaining the cut-off plates 142 in their retracted position, there is provided a pair of retaining rods 160 having laterally extending arms 162 thereon pivotally supported on brackets 164 by virtue of an elongated rod 166 which interconnects the inner ends of the arms 162. An axial coil spring 168 encircles the rod 166 adjacent each end thereof and has one hook-shaped end 170 engaged with the arm 162 and an extending end 172 engaged with the sliding plate 76 thereby urging the rod 160 into overlying engagement with the closure plates 142. When the closure plates 142 are elevated to their retracted position, the rod 160 is pivoted outwardly until the closure plates are pivoted against the stop member 158. Then the rod 160 is released and will retain the cut-off plates 142 in their retracted position.

As illustrated in FIGURE 3, the cut-off plates 142 do not extend completely across the hopper but extend substantially thereacross whereby a relatively narrow film or material may be spread with all of the cut-off plates in their extended position. The width of the path of material or film of material being spread may be increased in six inch increments by opening successive cut-off plates 142. Of course, the entire flow of material may be cut off by lowering the sliding plate 76 to the position shown in FIGURE 5 which will effectively close the entire hopper. Thus, by moving all of the cut-off plates 142 to a retracted position, the entire full width of the spreader may be employed with the control being provided by the sliding plate 76. By opening the desired number of cut-off plates 142, the width of the film of material being spread may still be controlled by controlling the sliding plate 76 with the cut-off plates 142 forming an effective closure for a portion of the width of the spreader as clearly indicated in FIGURE 1.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A spreader attachment for dump body trucks comprising a hopper having an outlet in the bottom thereof, a vertically sliding plate forming a valve for the outlet, a plurality of cut-off plates movably attached to the sliding plate and forming an extension thereof for forming an adjustable partial valve for the outlet of the hopper thereby varying the width of discharge from the hopper with the sliding plate providing adjustment in the depth of discharge from the hopper, means connected to said sliding plate for effecting control thereof, said means being mounted on the hopper and manually controlled, and means interconnecting the cut-off plates and the sliding plates for retaining the cut-off plates in extended and retracted position, said hopper including a front wall, end walls and a main plate forming a rear wall, the front wall adapted to be connected to the bottom of the dump body and to depend therefrom, said main plate extending to the top of the dump body in spaced relation to the rear edge thereof, and end plates connected to the main plate and adapted to be connected to the dump body for guiding material into the hopper, the end walls of the hopper extending upwardly to a position adjacent the bottom end of the end plates, said end plates being laterally adjustably attached to the main plate for varying the position thereof thereby enabling the hopper to be mounted on dump bodies having different widths, each of said cut-off plates being hingedly attached to the lower edge portion of the sliding plate, said means for retaining the cut-off plates in extended position including a lock pin, each of said cut-off plates and said sliding plate having a projecting flange spaced from the hinge axis with the projecting flanges having alignable apertures for receiving the lock pin thereby locking the cut-off plate in alignment with the sliding plate for forming an extension thereof.

2. The structure as defined in claim 1 wherein said means for retaining the cut-off plates in retracted position includes stop means on the sliding plate for limitng the upward swinging movement of the cut-off plates to a retracted position, and a spring biased rod engaging the outer surface of the cut-off plates for retaining the cut-off plates in retracted position against the stop member.

3. The structure as defined in claim 2 wherein said means for controlling the sliding plate includes a pair of lift links, segmental meshed gears connected to the upper ends of the links, handle means connected to one of said gears, and an operator's seat mounted on the main plate whereby the handle means will be accessible to the operator.

4. The structure as defined in claim 3 wherein a pair of footrests are provided for the operator, one of said footrests being disposed behind the cut-off plates and being pivotally attached to the main plate for movement to an out-of-the-way position to enable the cut-off plates to move between a retracted and extended position.

5. A spreader attachment for dump type load carrying bodies comprising a hopper having an outlet across the bottom thereof, a vertically sliding plate forming a valve for the outlet, a plurality of cut-off plates pivotally attached to the sliding plate and forming an extension thereof for forming a partial valve for the outlet of the hopper thereby varying the width of discharge from the hopper, means connected to said sliding plate for vertically adjusting the plate thereby adjusting the depth of discharge of the material from the hopper, said hopper including a front wall, end walls and a rear wall, said means for adjusting the sliding plate being mounted on the rear wall of the hopper, said front wall being connected to the bottom of the body in depending relation, the rear and end walls extending substantially to the top edge of the body for guiding material into the hopper, means mounted on the sliding plate and engaged with the pivotal cut-off plates for retaining the plates in extended position substantially in alignment with the sliding plate thereby cutting off flow from a portion of the outlet for the hopper while permitting flow from the remainder of the outlet, and means on said sliding plate for engagement with the cut-off plates when the cut-off plates are pivoted to a retracted position lying alongside of the exterior surface of the sliding plate.

6. The structure as defined in claim 5 wherein said means for retaining the cut-off plates in extended position includes a plurality of lockpins, said sliding plate and each of said cut-off plates having alignable apertures therein for receiving the lockpins thereby locking the cut-off plates in alignment with the sliding plate.

7. The structure as defined in claim 6, wherein said means for retaining the cut-off plates in retracted position includes a pivotally supported rod engaging the outer surfaces of the cut-off plates when they are pivoted to a retracted position thereby retaining the cut-off plates in retracted position adjacent the outer surface of the sliding plate.

References Cited in the file of this patent

UNITED STATES PATENTS

| | | |
|---|---|---|
| 1,690,090 | Hendricks | Oct. 30, 1928 |
| 2,005,896 | Hurt | June 25, 1935 |
| 2,850,216 | Webster | Sept. 2, 1958 |

FOREIGN PATENTS

| | | |
|---|---|---|
| 985,817 | France | Mar. 14, 1951 |
| 19,348 | Great Britain | of 1889 |